Feb. 23, 1965
P. OCHS
3,170,346
PRESET TORQUE WRENCH
Filed June 15, 1962
3 Sheets-Sheet 3
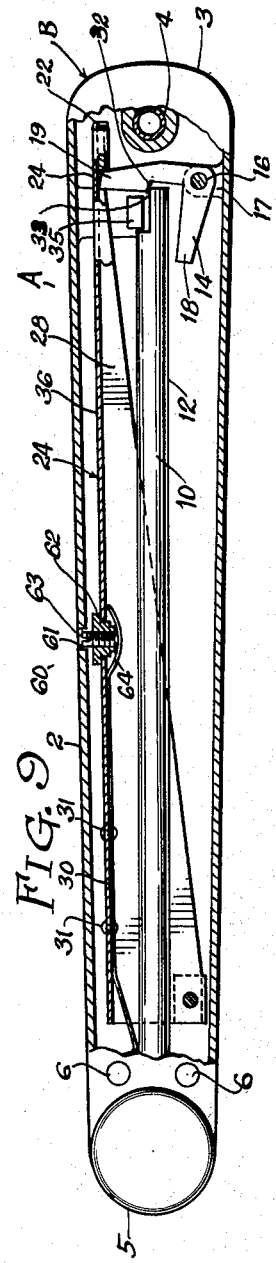
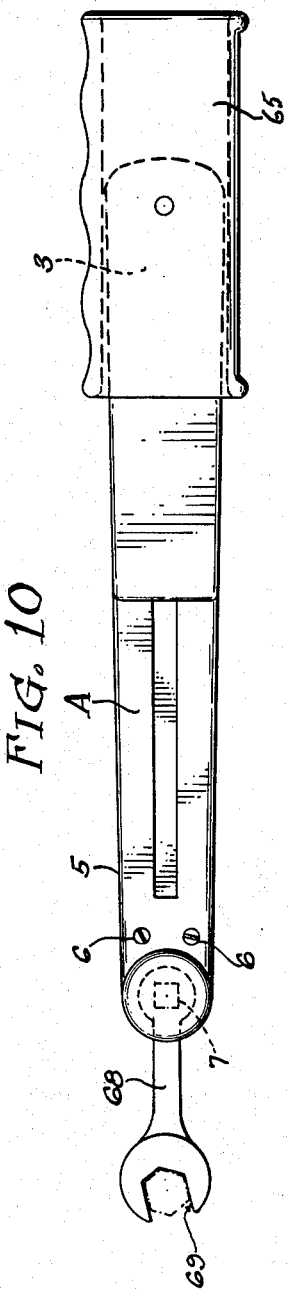
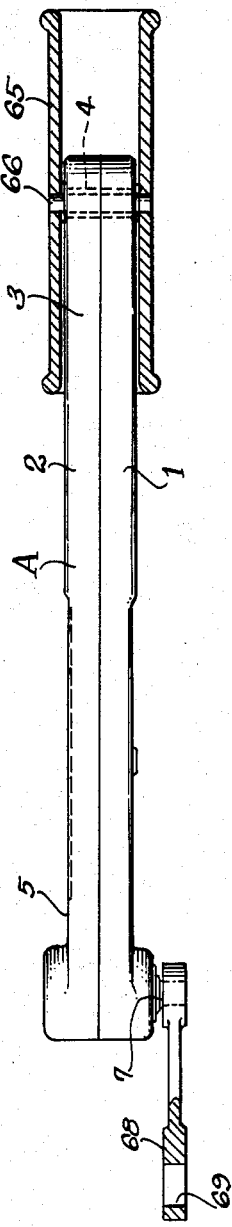
INVENTOR.
Paul Ochs

United States Patent Office 3,170,346
Patented Feb. 23, 1965

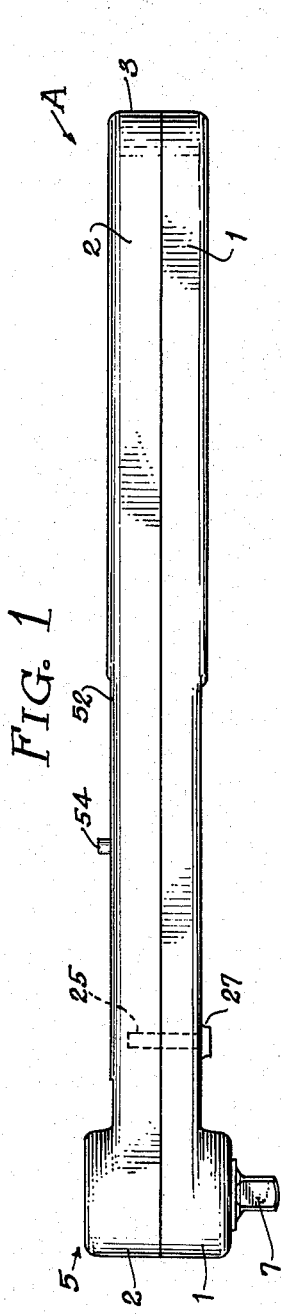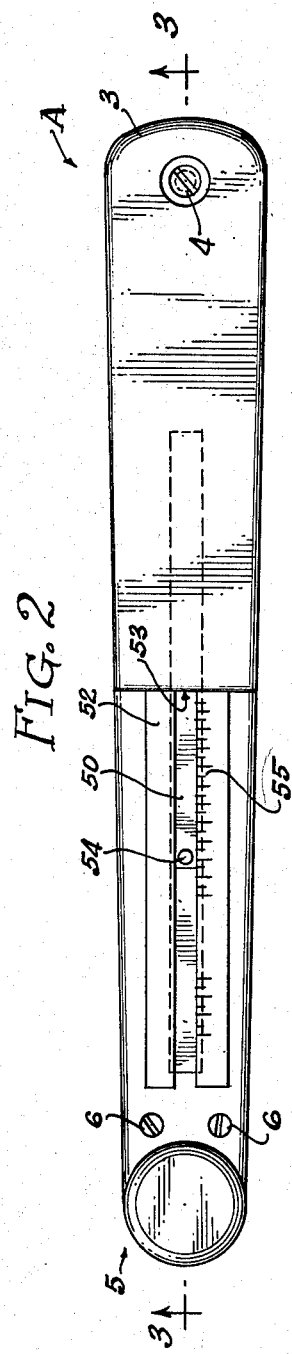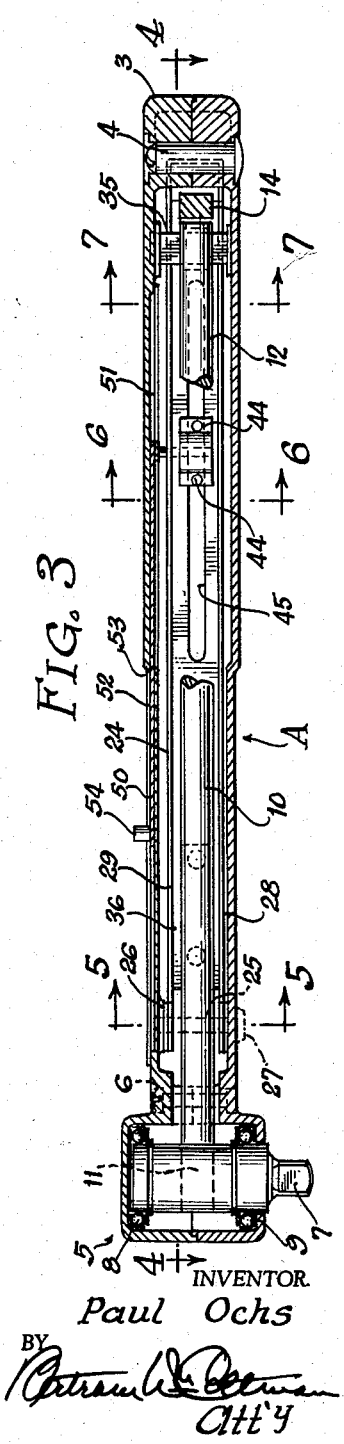

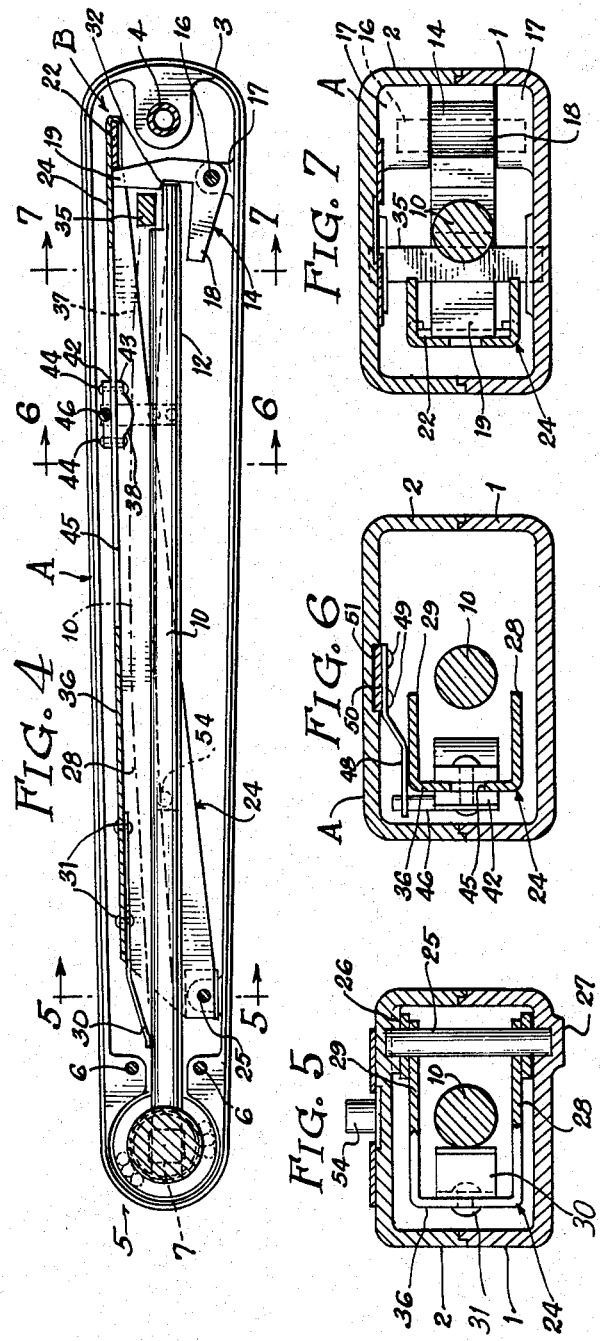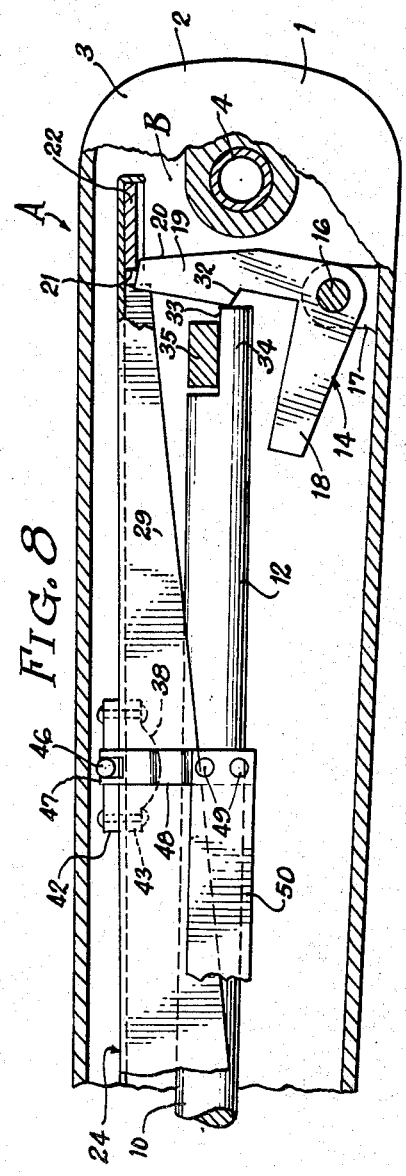

---

3,170,346
PRESET TORQUE WRENCH
Paul Ochs, Glen Ellyn, Ill., assignor to P. A. Sturtevant Co., Addison, Ill., a corporation of Illinois
Filed June 15, 1962, Ser. No. 202,795
4 Claims. (Cl. 81—52.5)

This invention relates to a force-transmitting mechanism, and, more particularly, to a preset type of torque wrench.

When applied to a torque wrench of this type, the invention broadly has to do with a force-limiting structure employing a rigid casing and a fixed or predetermined measuring or lever length within the casing, the applied force being utilized to create a hammer blow in order to indicate the application of a predetermined torque at the work and prevent further transmission of the force by the measuring beam to the work.

An object of the invention is to provide a compact preset sealed torque wrench that does not require visual observation during use and which is simple, accurate and inexpensive to construct.

A further object of the invention is to provide a preset torque wrench wherein the applied load lever length or measuring length within the casing remains fixed regardless of the location along the casing gripped by the operator to apply the force producing the torque applied to the work.

A still further object of the invention is to provide a torque wrench of a character wherein no visual reading or use of an indicating pointer is used and the measuring element is a part of the signalling mechanism.

A still further object is to provide a simple form of torque wrench of this type having a minimum number of moving parts and wherein the measuring element is a part of the signalling mechanism and serves actually to trip a trigger effecting release of a trigger hammer.

A simple form of adjustment is provided along the trigger so that the applied torque at the load may be predetermined and the deflecting measuring element may engage the trigger mechanism to actuate a release dog.

Other objects and advantages of the invention will be apparent from the following description when taken in connection with the accompanying drawings which form a part hereof.

In the drawings:

FIGURE 1 is a side elevational view of a torque measuring wrench embodying the invention;

FIG. 2 is a top view of the wrench;

FIG. 3 is a transverse vertical section of the wrench taken along line 3—3 of FIG. 2;

FIG. 4 is a transverse horizontal section of the wrench taken along line 4—4 of FIG. 3;

FIG. 5 is an enlarged cross section taken along line 5—5 of FIG. 4;

FIG. 6 is also an enlarged cross section but taken along line 6—6 of FIG. 4;

FIG. 7 is another enlarged cross section taken along line 7—7 of FIG. 4;

FIG. 8 is an enlarged vertical section of the rear portion of the wrench to show the momentary release of the parts immediately after the deflection of the measuring beam engages and trips the trigger to release the hammer member and the measuring beam itself in order to effect an audible sensual blow against the casing.

FIG. 9 is a detail sectional view illustrating an alternative or modified form of torque adjustment mechanism; and FIGS. 10 and 11 are views illustrating how the present pre-set type of torque wrench may adopt a floating type of handle to allow accurate use of adapters and extensions.

The structure illustrated in the drawings comprises, as shown specifically in FIG. 1, a housing A having a lower part 1 and an upper part 2 secured at the handle end 3 by a screw and rivet connection 4 and at the other end 5 by any suitable fastening means 6 such as screws or the like. End 5 is enlarged to accommodate a work-engaging member 7 seated in upper and lower sets of ball bearings 8 and 9, these being carried by suitably disposed bearing races seated within the enlarged end 5 to minimize friction caused by side forces during the operating action and by the handling of the tool by the operator.

A measuring or torque beam 10 is fixed at its front end 11 in work-engaging member 7, and it is so disposed in housing A that the rear end 12 thereof lies within the area of the rear end 3 of housing A. An overload release, broadly designated B, cooperates with rear end 12 of beam 10 so that, when a predetermined torque is applied at work-engaging member 7, there will be a momentary breakaway of housing A at end 3 causing a reflex signalling that sends a strong impulse to the operator's hand. The force applied to housing A by the operator will then be discontinued and the torque beam 10 freed of any further transmission of this force. When this occurs, overload release B is immediately restored to operating condition.

Overload release B comprises a hammer member 14 pivotally carried by pin 16 mounted in, say bosses 17 formed on the inner sides of lower housing part 1. Hammer member 14 is formed with two legs 18 and 19, lower leg 18 extending forwardly below the end 12 of torque beam 10. Upper leg 19 has a tapered rear edge 20, there being a corresponding tapered edge 21 on a trigger latch 22 carried by the far end of a trigger 24. Trigger 24 lies somewhat in the same general direction within housing A as torque beam 10 and is pivotally carried by a pin 25 set into enlargements 26 and 27 in the forward end of housing A. This trigger 24, preferably in the embodiment disclosed herein, is of a somewhat channel formation so that its opposite parallel sides 28 and 29, carried by center wall 36, will extend downwardly on opposite sides of torque beam 10, the pin 25 being disposed below this torque beam 10.

At the front end of trigger 24, a spring 30 is secured thereto at 31 so that a portion of the spring extends beyond the trigger and then downwardly to bear against torque beam 10 near its fixed connection with work-engaging member 7. Spring 30 tends to urge trigger 24 upwardly about its pivot 25. The tendency of spring 30 is therefore to urge trigger latch 22 upwardly and to keep hammer member 14 in its locked or set position, as shown in FIG. 4. When hammer member 14 is in this position, a tapered shoulder 32 on this hammer member 14 rests upon or engages over the far end or tip 33 of the reduced end 34 of torque beam 10 and holds the latter downwardly and away from beam stop 35. The action of spring 30 to urge the free end of trigger 24 carrying trigger latch 22 upwardly releasably locks these parts in the relation shown in FIG. 4 and prevents clockwise rotation of hammer 14.

Regardless of where the operator may grip housing A, the force will be transmitted through hammer member 14. Continued application of this force transmits it at shoulder 32 through torque beam 10 to work-engaging member 7. The work will be rotated and tightened. The torque at the work-engaging member 7 then builds up and causes deflection of torque beam 10, and when this deflection reaches the dotted line position 37, shown in FIG. 4, torque beam 10 will engage a bumper 38. This dotted line position 37 represents an application of a predetermined torque at work-engaging member 7, but, as the application of the force on housing A is continued, the deflection of torque beam 10 continues and bears against bumper 38 to lift the same and to trip trigger latch 22 free of the upper end of upper leg 19 of hammer member 14. With torque beam 10 in its deflected position, it will force its tip 33 to slide along tapered shoulder 32 and force hammer member 14 backwardly to free torque beam 10 therefrom. The action is quick and, hence, the end of torque beam 10 will strike against beam stop 35 fixed to housing A with considerable force, causing an audible sensual impulse blow that will be imparted momentarily through housing A to the operator.

Torque beam 10 will then be released from its deflected position shown by dotted line 37 and returned to its straight position shown in FIG. 4. The straightening action of beam 10 will force tapered shoulder 32 again over and upon tip 33 of beam 10 and further simultaneously will permit trigger latch 22 to lock hammer member 14 in the position shown in FIG. 4. Thus, the parts have been reset for another momentary releasing upon the application again of a predetermined torque at work-engaging member 7.

Bumper 38 is adjustably carried along trigger 24 and constitutes a torque release adjustment determining the torque to be applied at work-engaging member 7 that will momentarily effect release of the overload release mechanism B. The center portion 36 of trigger 24 is slotted at 45 to allow pins 44 to ride in the same, these pins clamping together a pair of plates 42 and 43 that comprise bumper 38. A pin 46 is fixedly seated in upper plate 42 to extend crosswise and be forked at 47 by a member 48 that is riveted at 49 to a bar 50 riding in a slot 51 in the underside of upper housing part 2. As shown in FIGS. 2 and 3, upper housing 2 is recessed at 52 and is slotted at 53 to allow bar 50 to extend out of the housing and ride in recess 52. At the far outer end of bar 50, a pin 54 extends slightly outwardly so that it may be gripped to move bar 50 forwardly or backwardly to move bumper 38 along slot 45 in center leg 36 of trigger 24. Calibrations 55 may be provided at one side of recessed portion 52 of housing member 2 to indicate the predetermined torque setting of bumper 38 or the position in which this bumper 38 must be when the deflection of torque beam 10 represents a predetermined torque to be applied at work-engaging member 7.

As previously stated, the dotted line position of torque beam 10 shown in FIG. 4 indicates the deflection of this torque beam at a predetermined torque to be applied at work-engaging member 7. In its deflected position, the torque beam 10 will engage and lift bumper 38 to trip trigger latch 22 free of the tapered tip of leg 19 of hammer 14 (FIG. 8). This action will release hammer 14 at 32 from the tip 33 of end 34 of torque beam 10 so as to allow this end to forcibly strike against beam stop 35 thus causing an audible sensual impulse blow that will be imparted momentarily through housing A to the operator. Thus released, the torque beam 10 will straighten itself from its deflected position and cause tip 33 to ride downwardly again along tapered edge 32 of hammer 14, thereby swinging hammer 14 slightly counterclockwise as shown in its position in FIG. 4. Trigger latch 22, acting under the influence of spring 30, will lock its tapered face 21 against the tip of tapered edge 20 of hammer 14 and hold hammer 14 in this position, the tapered edge 32 bearing upon and against tip 33 of end 12 of torque beam 10. When the wrench is again used, the force applied to housing A will be transmitted again through hammer 14 and torque beam 10. As the work is tightened by member 7, the torque thus applied at the work will, when reaching a predetermined value, cause deflection of torque beam 10 and as the torque increases and the deflection of the beam also increases, a torque value will be reached that will cause the deflected beam 10 to engage the trip bumper 38 and release trigger latch 22 from hammer 14. The action of torque beam 10 in its deflected position will cause its end 12 to forcibly strike beam stop 35 again and cause, as previously stated, an audible impulse blow capable of being momentarily imparted through housing A to the operator. The parts comprising overload release B will then reset themselves automatically for the next operation of the wrench.

The adjustment of the torque setting is simple and easily accomplished. The torque beam 10 itself trips the trigger member 24 and its latch 22. The latch 22 releases the hammer member 14 that directly engages the torque beam 10 and restrains its action during its deflecting movement as the torque being applied at the work by the work-engaging member 7 reaches a predetermined value. These parts are few and simply designed so as to effect accurate and positive operation of the wrench. The locations of the operator's grip on housing A will not affect the accuracy of the device in effecting a preset torque at the work and a quick release when the preset torque is reached.

As previously stated, bumper 38 is adjustably carried along trigger 24 and constitutes a torque release adjustment determining the torque to be applied at work-engaging member 7 that will momentarily effect release of the overload release member. FIG. 9 illustrates an alternative or modified form of this torque release adjustment. Instead of the slidably adjustable bumper 38, a calibrated unit 60 threadably carried in the center wall 36 of trigger 24 and accessible for adjustment through an opening 61 in casing part 2 may be used. This calibrated unit 60 may comprise a collar insert 62 fixed in center wall 36 of trigger 24 and a pin 63 threadably carried in collar 62. Spring 30 may extend a distance beyond its points of attachment 31 below wall 36 and terminate, say, in a cuplike end 64 directly below collar 62. Collar 62 has a threaded opening which receives pin 63 and which aligns with opening 61 in casing part 2 so that the lower tip of pin 63 may rest in or engage against this cuplike end 64.

A pointed instrument may be inserted in opening 61 to engage pin 63 and cause it to be adjustably moved back and forth in collar 62 so as to cause the distance between the curved cuplike end 64 of spring 30 and beam 10 to vary, thereby providing a torque release adjustment determining the torque to be applied at work-engaging member 7 that will momentarily effect release of the overload release mechanism B. The cuplike end 64 of spring 30 in this modified form is the equivalent of the under curved surface of bumper 38 shown in FIG. 4. As the distance between this cuplike end 64 and the torque beam 10 decreases to a point where beam 10 engages and lifts the cuplike member 64 upon deflection of beam 10 when a turning force is being transmitted by it to work-engaging member 7, the trigger latch 22 will trip free of the tapered tip of leg 19 of hammer 14 (FIG. 8). This action will, in the same manner as before explained, release hammer 14 at 32 from the tip 33 of end 34 of torque beam 10 so as to allow this end to forcibly strike against beam stop 35, thus causing an audible sensual blow that will be imparted momentarily through housing A to the operator. Thus released, the torque beam 10 will straighten itself from its deflected position and cause tip 33 to ride downwardly again along tapered edge 32 of hammer 14, thereby swinging hammer 14 slightly counterclockwise, as shown in its position in FIG. 4.

FIGS. 10 and 11 illustrate how the present preset type of torque wrench may readily accommodate adapters or extensions together with a pivotal type of handle grip and maintain a fixed measuring or lever length. The wrench shown in these figures, generally as A, which is the designation of the rigid casing of the wrench shown in the previous illustrations, has a handle end 3 and a work-engaging member 7 at end 5. Lower and upper parts 1 and 2 of casing A are secured together by the same hollow rivet 4 at handle end 3 and by screws 6 at the work-engaging end 5. A pivotal handle 65, and shown in FIGS. 10 and 11, is carried by a pin 66 inserted in pivot 4.

At the forward end 5, an adapter or extension 68 is shown as carried by work-engaging member 7. This adapter 68 may be any rigid shape or form of work-engaging member 69 extending longitudinally forward from the axis of and is attachable to the drive square 7 of the wrench itself. The applied load lever length of a torque wrench should remain fixed when adapters of any length are used because the adapters will increase the preset torque in proportion to the lever length of the adapters with respect to the fixed applied load lever length of the torque wrench. Also, when the hand hold position is varied, the ratio of lever length between the torque wrench adapters and applied load lever length of the torque wrench itself will not remain constant and a change in the torque output at the adapter will result even though a rigid frame type of torque wrench has a fixed measuring or lever length. The structure shown in FIGS. 10 and 11 will overcome these difficulties. The pivotal attachment of handle 65 at 66 in the hollow rivet 4 establishes a fixed or constant lever length for the adapter 68 and the torque wrench A. As long as this pivotal handle 65 fixes the lever length for the wrench and the lever length of adapter 68 is established, the applied load lever length of the torque wrench may then be fixed and remain so because the torque wrench will always be gripped at handle 65 which establishes a fixed lever length for the torque wrench by reason of rivet 4.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A force-transmitting mechanism comprising a housing, a work-engaging member disposed at one end of said housing, a torque beam in said housing, said torque beam being fixed at one end to said work-engaging member, an overload release operatively disposed within said housing adjacent the other end of said torque beam, said overload release including a trigger member and a hammer member releasably associated with each other and with said other end of said torque beam, the force applied to said housing being transmitted by said hammer member to said torque beam and work-engaging member, and means for tripping said trigger member to release said hammer member from said torque beam upon the application of a predetermined torque at said work-engaging member, said tripping means being engaged and actuated by the deflection of said torque beam.

2. A force-transmitting mechanism comprising a housing, a work-engaging member associated with said housing at one end, a torque beam disposed in said housing and having its forward end fixed to said work-engaging member, an overload release disposed in said housing adjacent the rear end of said torque beam, said overload release including a member pivotally connected to said housing adapted to transmit the force applied at said housing to said torque beam, and a second member also pivotally connected to said housing to trip the first said member upon the application of a predetermined torque to said housing, said second member having a portion engageable by said torque member upon deflection thereof to cause said second member to trip said first member.

3. A force-transmitting mechanism comprising a housing, a work-engaging member associated with said housing at one end thereof, a torque beam disposed within said housing and having a fixed measuring length, said torque beam at its forward end being connected in fixed relation to said work-engaging member, means normally restraining the movement of said torque beam at its opposite end, said means including a member pivoted to said housing and releasably engaging said opposite end of said torque beam, a stop secured within said housing against which said opposite end of said torque beam strikes when released by said member, and a second member restraining said first member but releasing the same to release said torque beam upon the application of a predetermined torque at said work-engaging member, said second member being actuable to release said first member by the deflection of said torque beam.

4. A force-transmitting mechanism comprising a housing, a work-engaging member associated with said housing at one end thereof, a torque beam disposed within said housing and having a fixed measuring length, said torque beam at its forward end being connected in fixed relation to said work-engaging member, means normally restraining the movement of said torque beam at its opposite end, said means including a member pivoted to said housing and releasably engaging said opposite end of said torque beam, a stop secured within said housing against which said opposite end of said torque beam strikes when released by said member, a second member restraining said first member but releasing the same to release said torque beam upon the application of a predetermined torque at said work-engaging member, said second member being actuable to release said first member by the deflection of said torque beam, and means adjustably movable to vary the degree of deflection of said torque beam capable of actuating said second member.

References Cited by the Examiner

UNITED STATES PATENTS

| 1,512,192 | 10/24 | Benko. | |
| 2,300,652 | 11/42 | Cooney | 81—52.5 |
| 2,400,205 | 5/46 | Livermont | 81—52.5 |
| 2,679,777 | 6/54 | Muth | 81—52.5 |
| 2,734,411 | 2/56 | Woods | 81—52.4 |
| 2,789,454 | 4/57 | Woods | 81—52.5 X |
| 2,996,940 | 8/61 | Van Hoose | 81—52.4 |
| 3,039,339 | 6/62 | Hanson. | |

FOREIGN PATENTS

| 735,318 | 8/55 | Great Britain. |

WILLIAM FELDMAN, *Primary Examiner.*